Oct. 11, 1938.   A. WALTON, JR   2,133,126
TRUCK
Filed Dec. 1, 1937
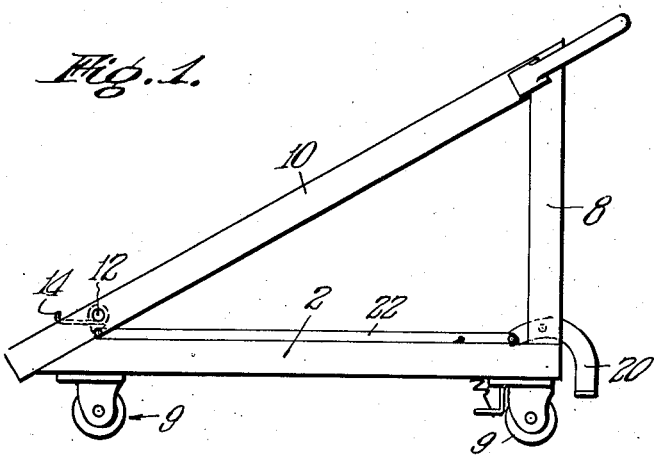
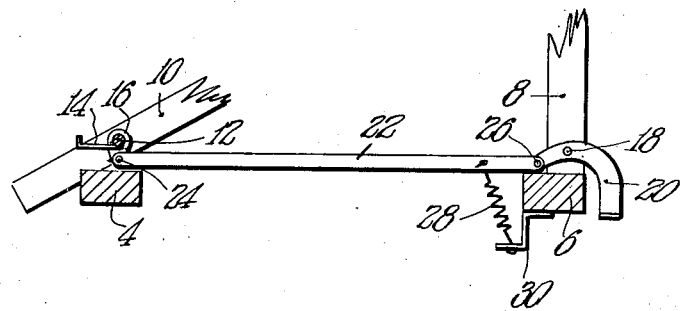
INVENTOR.
BY Albert Walton Jr.
Walter C. Pom.
ATTORNEY.

Patented Oct. 11, 1938

2,133,126

UNITED STATES PATENT OFFICE 2,133,126

TRUCK

Albert Walton, Jr., Springfield, Mass., assignor to Old Colony Envelope Company, Westfield, Mass., a corporation of Massachusetts Application December 1, 1937, Serial No. 177,595

1 Claim. (Cl. 280—49)

This invention relates to improvements in trucks and has for its principal objects the provision of a truck adapted both for transporting shipping-cases, boxes, and the like and for supporting them while they are being filled, closed, or otherwise worked upon.

The truck of this invention is of the same general type as that shown in U. S. Letters Patent #1,970,990 granted to me August 21, 1934, but as special features it has novel means which serves to hold the box on the truck but which may be readily released so that the box slides down an inclined surface to bring the lower forward edge of the box onto the floor or the like when the weight of the box and contents will cause the case to assume an upright position on the floor or other supporting surface.

The truck is simple in form so as to be economical to manufacture. It embodies but few parts yet it is efficient in operation.

Various other objects and advantages of the invention will become more apparent after a reading of the following description and reference will be had to the accompanying drawing wherein:

Fig. 1 is a side elevational view of a truck embodying the novel features of the invention; and Fig. 2 is a transverse sectional elevational view of the same.

Referring now to the drawing more in detail, the invention will be fully described A body or frame is provided which may consist of side rails 2, a forward rail 4, and a rear rail 6. Posts 8 extend upwardly from the rear side of the frame and there may be an upper rail extending between the uprights 8.

Supporting rails 10 extend downwardly in inclined relation from the upper sides of the posts 8 to the forward side of the truck. It will be understood that the parts described may be suitably joined together in some manner to provide a strong and rigid body and that the parts may be made from wood, metal or whatever material is desired.

Casters represented generally by 9 are preferably secured to the underside of the body so that the truck may be readily moved about.

A shaft 12 is journalled for oscillation in the forward side of the frame and this has one or more stop or retaining members 14 secured thereto. These stops 14 have upwardly extending lip portions, as shown, which are adapted to engage the forward bottom edge of a box or the like which may be supported on the inclined rails 10.

A lever 16 is attached to shaft 12 for oscillatory movements therewith. Pivoted by a pivot 18 to the rear of the frame, as to post 8, is a foot treadle member 20.

A connection 22 has its forward end pivoted, as by pivot 24, to lever 16 and its other end, as by pivot 26, to member 20. Preferably means to urge the connecting member 22 downwardly is provided and this may include a spring, such as 28, attached to the member 22 and to a bracket or the like 30 associated with the rear of the frame, as shown.

It will be noted that the pivots 18, 24, and 26 are not in alignment but that pivot 26 is normally below a line running through pivots 18 and 24. In this way, as treadle 20 is depressed and moved on its pivot 18 in a clockwise direction, the pivot 26 moves up so that connection 22 is caused to move rearwardly and upwardly whereby lever 16 is urged rearwardly and shaft 12 is rotated in a counter-clockwise direction.

This movement causes downward movement of the stop member 14 and releases engagement thereof with the box or the like which is supported on the rails 10. When so supported on rails 10, it is an easy matter to pack or fill the same after which the truck may be moved as desired.

While various modifications may be made without departing from the spirit and scope of the invention, what it is desired to claim and secure by Letters Patent of the United States is:

A truck of the class described comprising in combination, a frame having a forward object-supporting face inclining downwardly and forwardly, a shaft oscillatable in the lower forward side of the frame, a retaining member fixed to said oscillatable shaft adapted in one position of the shaft to extend beyond the face of said support to support an object thereon and in another position of the shaft to allow an object to slide downwardly on the said face, a treadle pivoted to the rear lower side of said frame having a rear portion engageable by the foot and a forward portion, a downwardly depending lever secured to the shaft, a horizontally extending link having its forward end pivotally connected to said lever and its rear end pivotally connected to the forward portion of the treadle, the pivotal connection between said link and said treadle being disposed below the plane of a line passing through the pivotal connection between the link and lever and the pivotal connection between the treadle and the frame.

ALBERT WALTON, Jr.